INVENTOR
William D. La Rue
BY H. S. Grover
ATTORNEY

Nov. 13, 1951 W. D. LA RUE 2,574,604

AUTOMATIC SELECTOR MECHANISM FOR RADIO APPARATUS

Filed Nov. 29, 1946 6 Sheets-Sheet 2

INVENTOR
William D. La Rue
BY H. G. Grover
ATTORNEY

AUTOMATIC SELECTOR MECHANISM FOR RADIO APPARATUS

Filed Nov. 29, 1946 6 Sheets-Sheet 3

INVENTOR
William D. La Rue
BY H. S. Grover
ATTORNEY

Nov. 13, 1951 W. D. LA RUE 2,574,604

AUTOMATIC SELECTOR MECHANISM FOR RADIO APPARATUS

Filed Nov. 29, 1946 6 Sheets-Sheet 4

INVENTOR
William D. La Rue
BY
H. S. Grover
ATTORNEY

Nov. 13, 1951 W. D. LA RUE 2,574,604

AUTOMATIC SELECTOR MECHANISM FOR RADIO APPARATUS

Filed Nov. 29, 1946 6 Sheets-Sheet 5

Inventor
William D. La Rue

By

H. S. Grover

Attorney

Inventor
William D. La Rue
By H. G. Grover
Attorney

Patented Nov. 13, 1951 2,574,604

UNITED STATES PATENT OFFICE 2,574,604

AUTOMATIC SELECTOR MECHANISM FOR RADIO APPARATUS

William D. La Rue, Beach Haven, N. J., assignor to Radio Corporation of America, a corporation of Delaware Application November 29, 1946, Serial No. 713,005

9 Claims. (Cl. 74—10.2)

My present invention relates in general to automatic selector mechanism, and more particularly to such mechanism which is adapted to effect the adjustment of variable elements of radio apparatus, such as transmitters and receivers, to predetermined selected positions.

It is desirable in certain radio installations to effect adjustment of both receivers and transmitters, expeditiously and accurately from one predetermined channel frequency to another. Each adjustment of such equipment, ordinarily involves the angular positioning of a plurality of rotary tuning condensers or other variable tuning elements, and in some instances also a crystal selector switch. The present invention is directed to an automatic selector mechanism for such use in radio installations.

One of the objects of my invention is to provide an automatic selector mechanism of relatively simple and rugged construction, and of small size, low weight, and high precision.

A further object of the invention is to provide positive locking means for the position-determining elements of the selector to thereby withstand accidental change of adjustment of the controlled device which may result from vibration or other cause.

A still further object of the invention is to provide a selector mechanism of such construction that it lends itself very readily to control and adjustment by a relatively simple electrical control system and which requires but a short time, not exceeding 5 seconds, within which to complete a cycle of operation.

A further object of the invention is the provision of an automatic clutch release whereby all drag is eliminated during the manual set-up of the mechanism to desired predetermined positions of adjustment and whereby manual set-up is permitted in either clockwise or counter-clockwise direction without affecting the accuracy of the set-up.

A still further object is to provide an improved lock between the stop-arms and the selector disc-assembly in order to reduce to a minimum the possibility of disturbing the selector disc settings during the locking operation.

A more specific object of the invention is to provide, in a selector mechanism for automatically adjusting a control shaft to one of a plurality of predetermined angular positions, the combination of a framework in which the control shaft to be adjusted in journalled, a selector disc-assembly having individually adjustable discs mounted on said shaft, a multi-position rotatable drum arranged in concentric relation with and spaced from the disc-assembly with but slight clearance, a plurality of disc stopping means, individually operable in dependence upon the drum position, pivotally supported from the framework and disposed externally of the drum, a reversible motor, means including a clutch interposed between said motor and control shaft operative upon rotation of the motor in one direction to drive the drum to a selected one of its positions, and means including said clutch operative upon rotation of the motor in the opposite direction to drive the selector disc-assembly to a position whereat it is stopped by the then operable disc stopping means.

To the accomplishment of the foregoing and such other objects and advantages as may hereinafter appear, the invention further consists in the structural combinations hereinafter sought to be defined in the claims and described more in detail in the following specification read in conjunction with the accompanying drawings in which:

Figure 1:
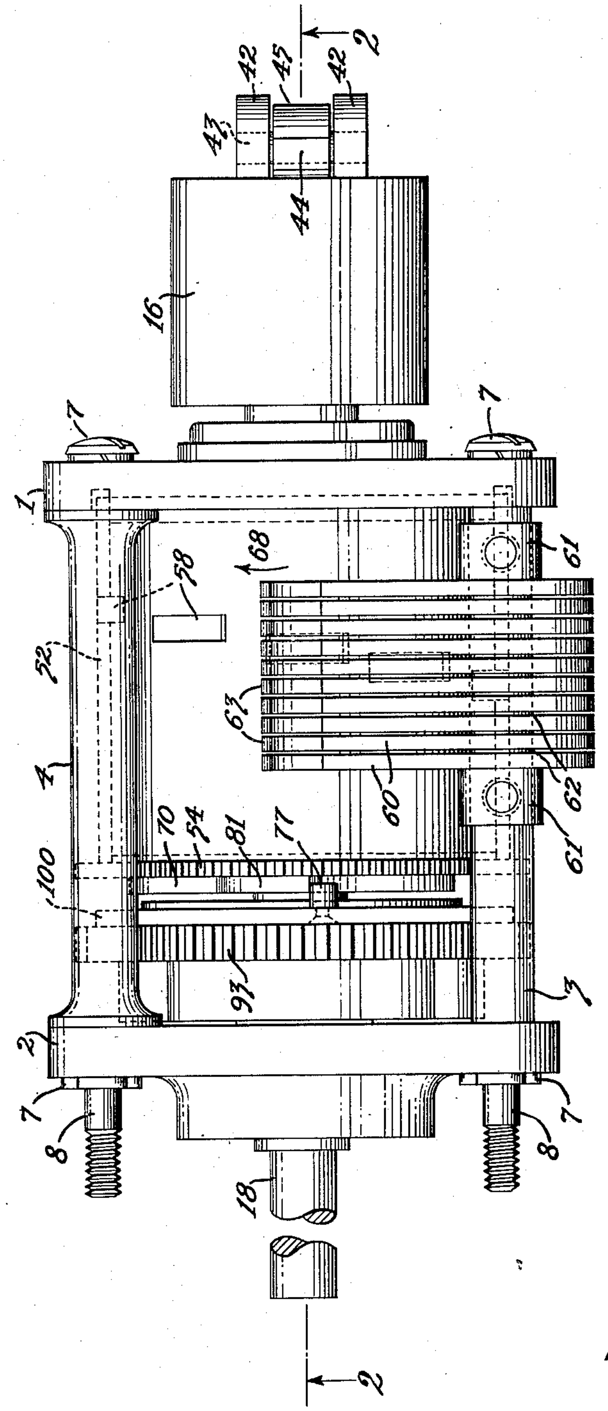
Fig. 1 is a top plan view, on an enlarged scale, of the selector mechanism in accordance with the invention.
Figure 2:
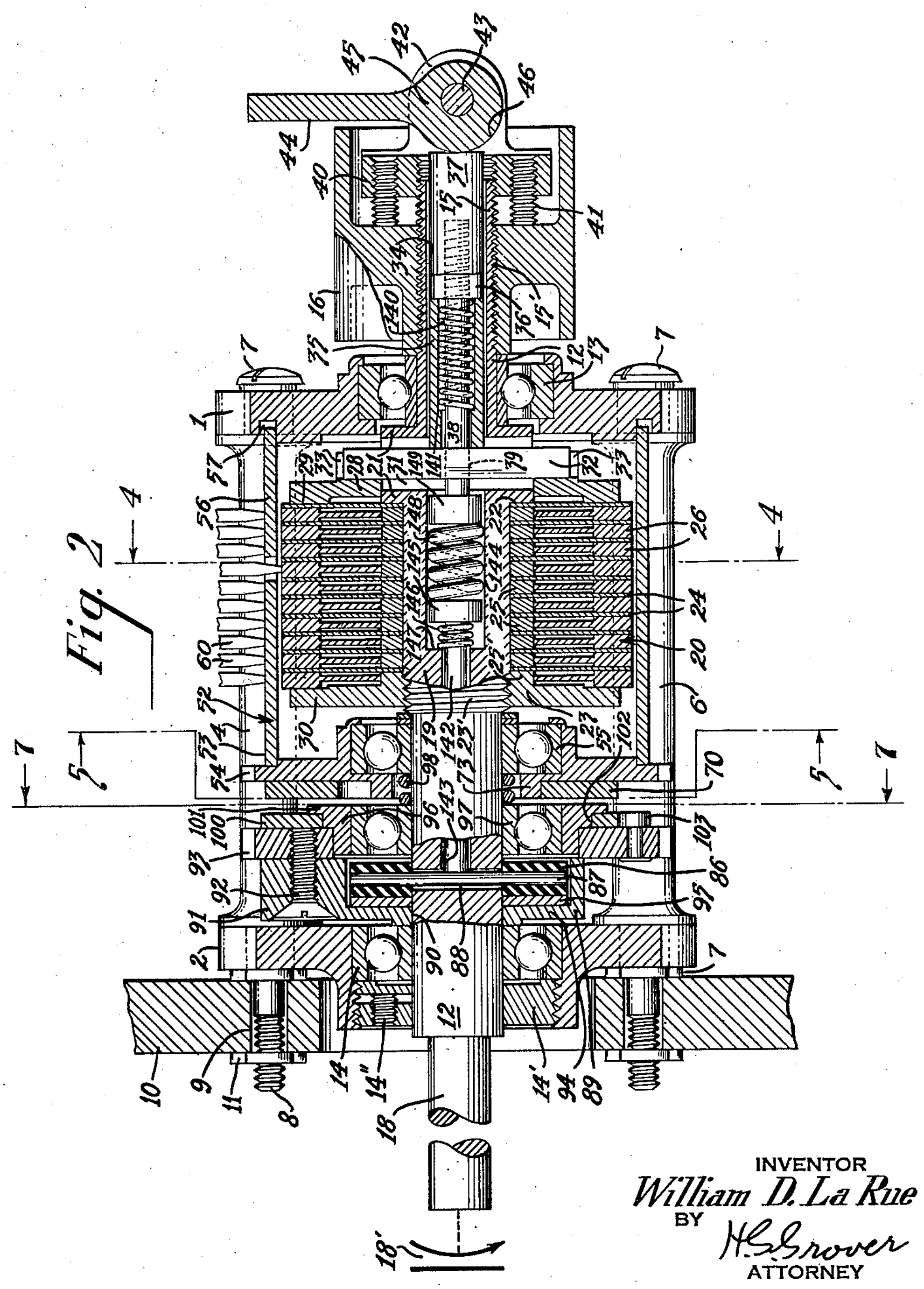
Fig. 2 is a transverse cross-sectional view of the mechanism, taken on the line 2—2 of Figs. 2, looking in the direction of the arrows.
Figure 3:
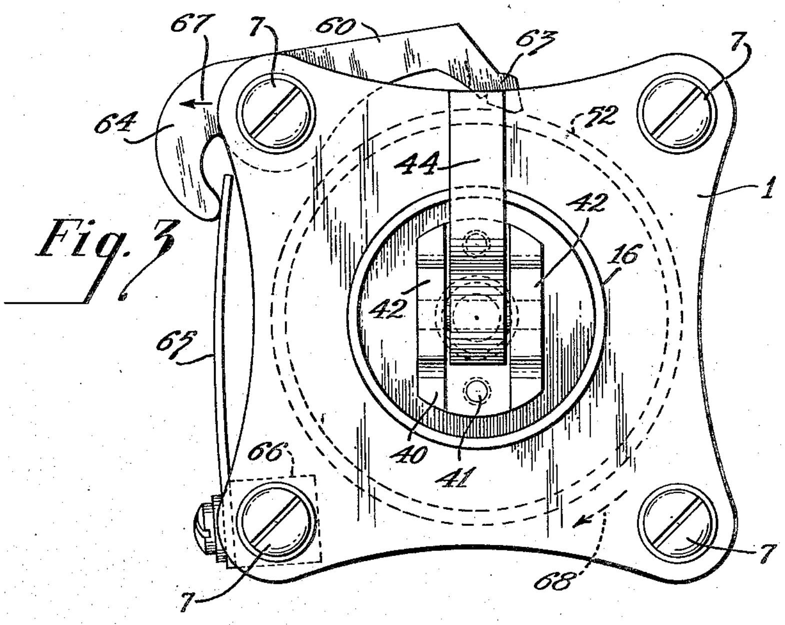
Fig. 3 is a front elevational view of the selector mechanism shown in Fig. 1.
Figure 4:
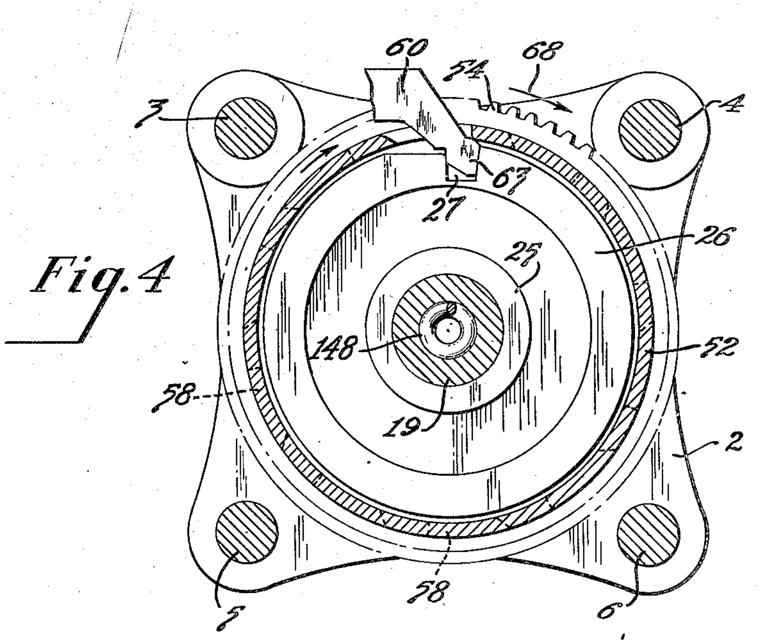
Fig. 4 is a cross-sectional view, taken on the line 4—4 of Fig. 2, looking in the direction of the arrows, showing a selector disc held in locked position by its associated stop-arm.

Referring now to the drawings, and more particularly to Figs. 1 to 4, the selector mechanism is shown to comprise a framework consisting of a front plate 1 and a rear plate 2 which are held in spaced, parallel relation by four-cross-rods 3 to 6, one in each corner, the front and rear plates being substantially rectangular in shape, as shown in Figs. 3 and 4, respectively. Bolts 7, one in each corner of the front and rear plates, serve to unite the cross-rods and plates together in a rigid framework. In order that the selector unit may be suitably mounted, the bolts at the rear plate are provided with threaded extensions 8 which are adapted to pass through apertures 9 in a supporting member 10, which may be the front panel of a receiver or transmitter, the unit being held in position by a nut 11 on each bolt extension.

Centrally arranged within the framework and extending through the front and rear plates is a control shaft 12 which is journalled in a ball bearing 13 retained within the front plate and in a ball bearing 14 retained within the rear plate. The forwardly extending portion 15 of the shaft is externally threaded at 15' and is adapted to receive a manual control knob 16. Within rear plate 2 is screw-threaded a plug 14' which serves to retain the ball bearing 14 in position and also to adjust the clutch torque to be described later. The rearwardly extending portion 18 of the shaft is adapted to be mechanically coupled in a suitable manner to a device to be adjusted, shown as a variable tuning condenser 18' by way of example. In the disclosed embodiment of the present invention condenser 18' is of the type having semi-circular fixed and rotor plates. The rotor, however, being mechanically coupled to the control shaft, is also continuously rotatable, although the condenser is effective through only 180°.

Carried by an intermediate portion 19 of the shaft 12, at the forward end thereof and between the end plates, is a selector disc-assembly shown generally at 20, and the parts associated therewith are shown in cross-section in Fig. 2 to which reference will now be made. Just behind the front plate 1, the intermediate portion 19 of the control shaft is provided with a portion 21 of enlarged diameter forming a shoulder 22 next adjacent shaft portion 19. Between said shoulder and a nut 23 which is screw-threaded on the shaft at 23' are disposed alternate spacers 24 and ring bushings 25. The nut 23 when tightened serves to clamp the several ring bushings and spacers against the shoulder 22 so that they rotate with the shaft as a unit. Encircling each of the bushings and disposed between adjacent spacers is a selector disc or ring 26 which is provided at one point in its periphery with a notch 27, shown more clearly in Fig. 4, there being a total of ten such selector discs in the device herein described. The discs or rings 26 serve as position-determining members for the control shaft and are capable of individual adjustment around the ring bushings 25 in a manner later to be described, in order that the notches 27 may be disposed in various angular positions with respect to the control shaft, the adjusted angular positions of the disc notches corresponding each to one of the predetermined angular adjustments, ten in the present instance, of the device to be adjusted, such as the condenser 18'.

Figure 2A:
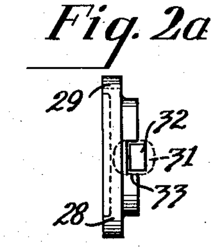
Fig. 2a is a detail view of a portion shown in Fig. 2.

For the purpose of clamping together the several selector discs 26 for rotation with control shaft 12 there is provided a pressure plate 28 slidably mounted on the enlarged shaft portion 21 so that by applying pressure to the plate in a rearward direction by means later to be described, the several discs are clamped together at their rims between a rearwardly extending rim portion 29 of the pressure plate and a second plate 30 formed integrally with the lock nut 23. The latter is provided with another integral portion 25' to serve as the bushing or hub for the rearmost selector ring 26. In order that pressure may be removed from the stack of selector discs to permit of individual angular adjustment thereof, and also for applying pressure to the discs to condition the assembly for normal operation, the shaft portion 21 is provided with a diametric bore or slot 31 which is elongated somewhat in the axial direction of the shaft (see Fig. 2*a*). A bar 32 is adapted to extend through the slot 31 and to have its opposite protruding ends seated within a pair of grooves or pockets 33 formed on the front face of the pressure plate. The pressure plate is thereby keyed to rotate with the shaft, but by reason of the axial direction of the slot the pressure plate is capable also of axial movement on shaft portion 21 in a manner later to be explained.

The front end 15 of the control shaft is provided with a central bore 34 within which there is fitted for sliding movement a sleeve 35, a nut 36 and a cap 37, all disposed end to end, the nut and cap being screw-threaded on the end of a rod 38 which extends through the sleeve 35 and also through a central aperture 39 in the rod 32. The rear end of sleeve 35 is adapted to abut against pressure-plate rod 32 and the front end of cap 37 is adapted to extend slightly beyond shaft end 15. On this end of the shaft, within the hollow of manual control knob 16, there is screw-threaded a plate 40 capable of being locked in position by a pair of screws 41 bearing against the inner wall of the knob. Plate 40 is provided with a pair of ears 42 between which there is supported a cross-pin 43 and on the latter there is pivoted a cam-lever 44. The pin is off-center with respect to the hub 45 of the lever to provide a cam surface at 46 for effecting the necessary sliding movement for the sleeve, nut and cap assembly 35–37. In Fig. 2, lever 44 is shown in its operative or locked position, with the sleeve 35 pushed rearwardly to exert pressure on plate 28 through rod 32. This is the normal operating condition for the disc stack of the selector assembly. However, by rocking lever 44 in the clockwise direction, as viewed in Fig. 2, the high side 46 of the cam is withdrawn from the forward end of cap 37, causing the pressure exerted by plate 28 to be removed since the assembly 35–37 is now free to move in a forward direction (to the right in Fig. 2). In this released position of lever 44 the disc assembly is conditioned for individual adjustment of the several selector discs. The manner in which such adjustment is carried out will be explained later. Cam surface 46 is in the form of an involute so that in returning lever 44 from released to locked position pressure on the disc stack will be applied gradually and uniformly.

In concentric relation with respect to the selector disc-assembly 20 and suitably spaced therefrom is a drum 52, to the rear rim portion 53 of which there is attached in a suitable manner a gear 54 adapted to rotate on the control shaft 12 next adjacent the disc-assembly, a ball-bearing 55 retained within gear 54 being provided for that purpose. A bearing surface for the front rim portion 56 of drum 52 is provided by an annular groove or channel 57 formed on the rear side of the front frame plate 1. As shown in Fig. 1, and also in Fig. 4, the drum is provided on its cylindrical surface with a plurality of slots 58, there being as many slots as there are selector discs. The several slots are radially aligned each with one of the selector discs, and they are also equi-angularly spaced around the circumference of the drum at 36° intervals, in the present case, assuming in effect a spiral formation.

Disposed externally of the disc assembly 20 and pivotally mounted on the cross-rod 3 (see Fig. 1) are a plurality of stop-arms or pawls 60 (ten in the present instance) which extend in a transverse direction to the axis of the control shaft. The stop-arms are retained in position by a pair of end collars 61, 61 suitably fastened to the rod 3, and interposed between adjacent arms are spacing rings 62 in order that the several stop-arms may be radially aligned with their respective drum slots which in turn are radially aligned with their respective selector discs.

Each stop-arm or pawl 60 (Figs. 3 and 4) is provided at one end with a locking part 63 which at the proper time during the cycle of operation of the mechanism is adapted to drop through its corresponding drum slot 58 and then interlock with the disc notch 27 of the corresponding selector disc. At the other end the arm is provided with a hooked or tail part 64 which coacts with the free end of a leaf spring 65. The opposite ends of the spring are suitably fastened to a member 66 carried on the cross-rod which is directly underneath the cross-rod 3 which carries the stop-arms. In a practical embodiment the springs 65 constituted the tines of a comb-like structure, the base of which was bolted to one face of the member 66 which was a sleeve, square-shaped in cross-section, and suitably supported on the cross-rod 5. Springs 65 coact with the tail parts 64 of the stop-arms in such manner that, in addition to their normal function of forcing the locking ends 63 into engagement with the selector discs 26, they act to take up any play that may develop due to wear, between the arms 60 and the rod 3 in the direction of the arrow 67 so that errors in the final adjustment of the mechanism which would otherwise arise are obviated thereby.

Drum 52 is capable of adjustment to any one of ten positions which correspond each to one of the predetermined angular adjustments previously mentioned, and each of said drum positions determines the particular stop-arm which is to be effective at a given time. The drum, in being driven to each of said positions, is capable of continuous rotation in only one direction, which in the disclosed embodiment is in the clockwise direction when viewed from the front of the mechanism. This direction is indicated in Figs. 1, 3 and 4 by an arrow designated 68.

Figure 5:
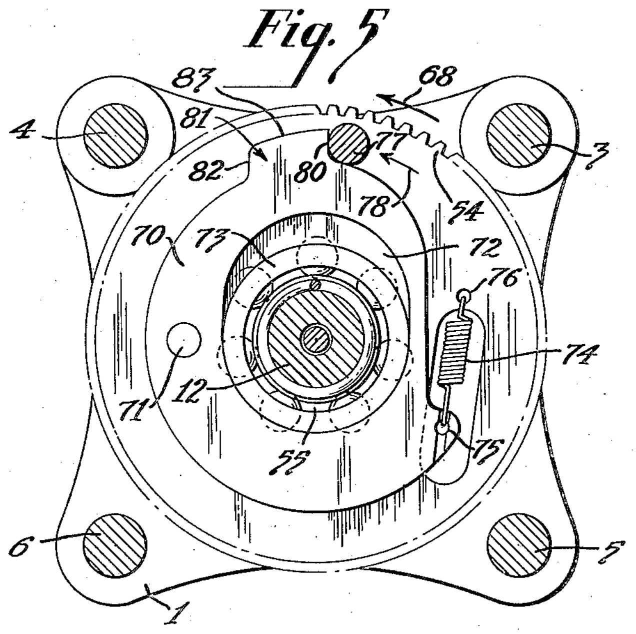
Fig. 5 is a cross-sectional view, taken on the line 5—5 of Fig. 2 looking in the direction of the arrows, showing the cooperative relation between the slip-cam and the drum during the early part of a cycle of operation when the drum is being driven to a predetermined position.
Figure 6:
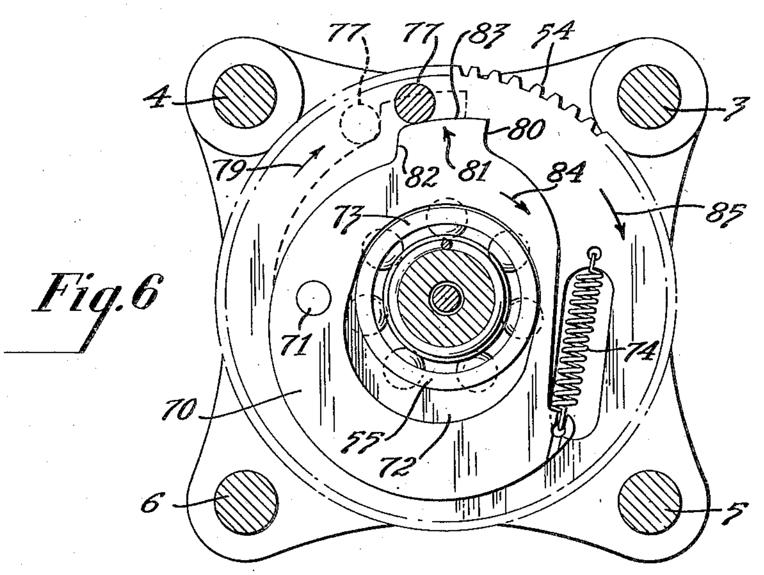
Fig. 6 is a cross-sectional view, similar to Fig. 5, showing the slip-cam actuated in the opposite direction for the purpose of backing up the drum to its arm-locking position shown in Fig. 4.

The drum actuating means will now be described, with reference particularly to Figs. 2, 5 and 6. A slip-cam 70 having the configuration shown in Fig. 5 is pivoted at an intermediate point at 71 to the rear face of drum gear 54. The cam is provided with a central aperture 72 which encircles a hub 73 extending rearwardly from the drum gear. In order to permit movement of the cam about its pivot 71 in a transverse direction, the central aperture 72 of the cam is elongated as shown. The slip-cam normally is in the position shown in Fig. 5, being urged to that position by means of a coil spring 74 having one end anchored to the cam at 75 and its other end anchored to the drum gear at 76. Since Fig. 5 is a view looking from the rear, which is opposite to the direction from which Figs. 3 and 4 are viewed, the counter-clockwise direction of rotation of drum gear 54 and slip cam 70 shown by the arrow in Fig. 5 corresponds to the clockwise direction of rotation in Figs. 3 and 4 of the same elements. The arrow in Fig. 5, therefore, has been designated by the same reference character 68.

For the present it is sufficient to state that the motive power for operating the selector mechanism is derived from an electrical, reversible motor which is coupled, through suitable reduction gearing to a clutch which in turn drives the slip-cam and drum assembly through a lost-motion connection, all to be described more fully hereinafter. At 77, in Fig. 5 and also in Fig. 1, is shown a stud which actually is carried by an element of the above-mentioned lost-motion connection; but for the present, in order to explain the coaction between the slip-cam and the drum, stud 77 may be considered as being driven first in the direction of arrow 78 in Fig. 5 and then in the reverse direction indicated by arrow 79 in Fig. 6.

Assuming then that the direction of motor operation is such that stud 77 moves in the direction of arrow 78, the drum and slip-cam assembly remain stationary until the stud reaches the right-hand edge 80 of cam projection 81, which is the position shown in Fig. 5. Continued actuation of the stud, however, causes the application of a driving force to the cam at 80, and since the hub 73 of the drum gear is now located at the bottom of aperture 72, the driving force is also applied to the drum gear, and the two will be rotated together in the direction of arrow 68 to a point determined by the electrical control system to be described later. Fig. 5 may be assumed to be one of the positions to which the drum gear may be actuated in the manner described above. At this point the motor reverses its direction of operation. The action that follows will now be described in connection with Fig. 6.

In the reverse direction of motor operation, stud 77 also rotates in the reverse direction (arrow 79) away from edge 80 of cam projection 81. During the interval that stud 77 travels from its position shown in Fig. 5 to the dotted line position shown in Fig. 6, the drum gear remains stationary. Upon continued rotation in the direction of arrow 79, the stud 77 engages successively edges 82 and 83 of the cam projection and rocks the slip-cam about its pivot 71 in the direction of arrow 84, depressing the cam until the upper edge of aperture 72 rests on hub 73. This is the position shown in Fig. 6. Stud 77 continues to ride on edge 83 in the direction of arrow 79, but before it reaches the right-hand edge 80 of the cam projection, the slip-cam 70, through the spring 74, will cause slight movement of drum gear 54 and drum 52 in the direction of arrow 85 (Fig. 6). Movement of stud 77 continues, however, and when it reaches the right-hand edge 80, the cam 70 is raised by spring 74, and the slip-cam and drum gear again assume their normal relative positions with respect to each other, as shown in Fig. 5. The rotation of the drum and its gear in the direction of arrow 85 (Fig. 6), it will be noted, is in a direction opposite to that (arrow 68) in which the drum is normally rotated. The extent of this backward movement of the drum, although slight, is sufficient to lock an operative stop-arm 60, and incidentally its associated selector disc, in a positive manner as will be explained later. This locking feature, it should be understood, is extremely advantageous in installations where excessive vibration is apt to cause an operative stop-arm to drop out or become disengaged from the notch 27 of its associated selector disc.

Figure 7:
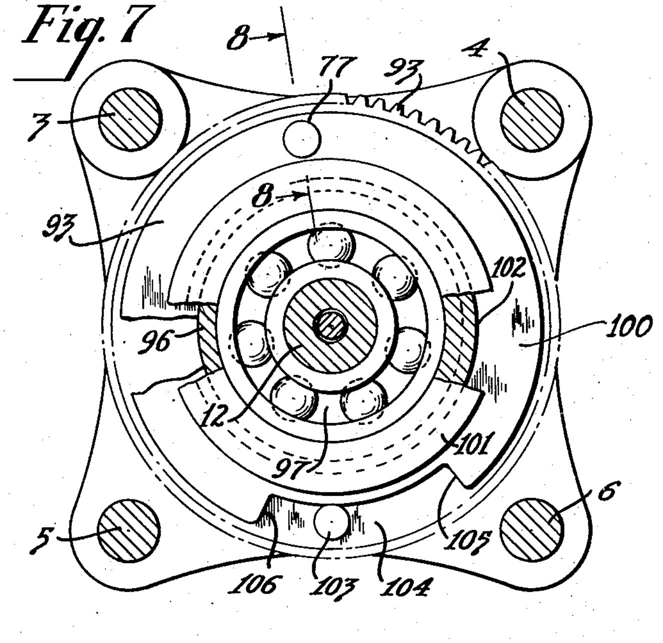
Fig. 7 is a cross-section taken on the line 7—7 of Fig. 2, looking in the direction of the arrows.
Figure 8:
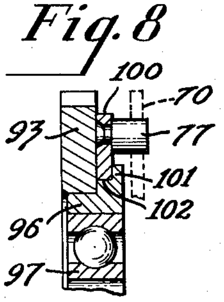
Fig. 8 is a cross-section taken on the line 8—8 of Fig. 7.

The clutch and lost-motion connection, mentioned above, which impart the necessary driving action from the motor to the selector mechanism, are disclosed in Figs. 2, 7 and 8. The clutch (Fig. 2) consists of a friction plate or disc 86 which encircles the selector shaft and is keyed thereto by means of a key or pin 87 extending diametrically through a slightly elongated hole 88 in the control shaft to permit axial movement of the clutch plate. Since the shaft and clutch plate are thus keyed together, the shaft will be rotated (if free to rotate) whenever the clutch plate is caused to be rotated; and the clutch plate, on the other hand, will be stationary whenever the shaft is locked in position, that is, when actuated to one of its predetermined selected positions.

The clutch plate 86 is enclosed in a cup-shaped retainer 89 located just in front of the rear frame plate 2. The retainer is provided with a central aperture 90 through which the control shaft extends, and also with three equidistantly spaced apertured ears 91 (only one being shown in Fig. 2) whereat the retainer is attached by means of screws 92 to the rear face of a gear wheel 93. Interposed between the retainer wall 94 and the clutch plate 86 is a second clutch plate or ring 95 of oilite. Gear wheel 93 is the drive gear for the mechanism and is motor-driven through suitable reduction gearing, not shown. This gear is mounted on an annular hub member 96 within which there is retained a ball-bearing 97 similar to the other ball-bearings 13, 14 and 55.

The lost-motion connection mentioned above is constituted by a ring member 100 which fits within an annular channel or groove formed by the rear face of gear 93 and a flange 101 formed on hub 96, said ring resting on a shoulder 102 of the hub which acts as a bearing surface for the ring. A pin 103 is riveted to gear 93 at one point adjacent its periphery and extends into an open arcuate slot 104 (Fig. 7) of suitable length formed in the ring member. At a point diametrically opposite the slot, the ring member has riveted to it the stud 77, previously referred to in connection with Figs. 5 and 6. The stud extends in a forward direction and is adapted to ride on the peripheral edge of the slip-cam 70 as previously explained and to cause rotation of the multi-position drum 52. In order to maintain the proper clearance between the drive gear and drum gear assemblies, a coil spring 98 of a few turns is interposed between their respective bearings 97 and 55. In operation, upon rotation of the gear wheel 93 in either direction, depending upon the portion of the cycle during which the motor is then operating, motion will not be transmitted to ring member 100 until pin 103 first reaches and then coacts with one or the other of the sides 105, 106 which define the opposite ends of the ring slot. The purpose of this lost-motion connection will be explained hereinafter in connection with the operation of the system as a whole.

Figure 9:
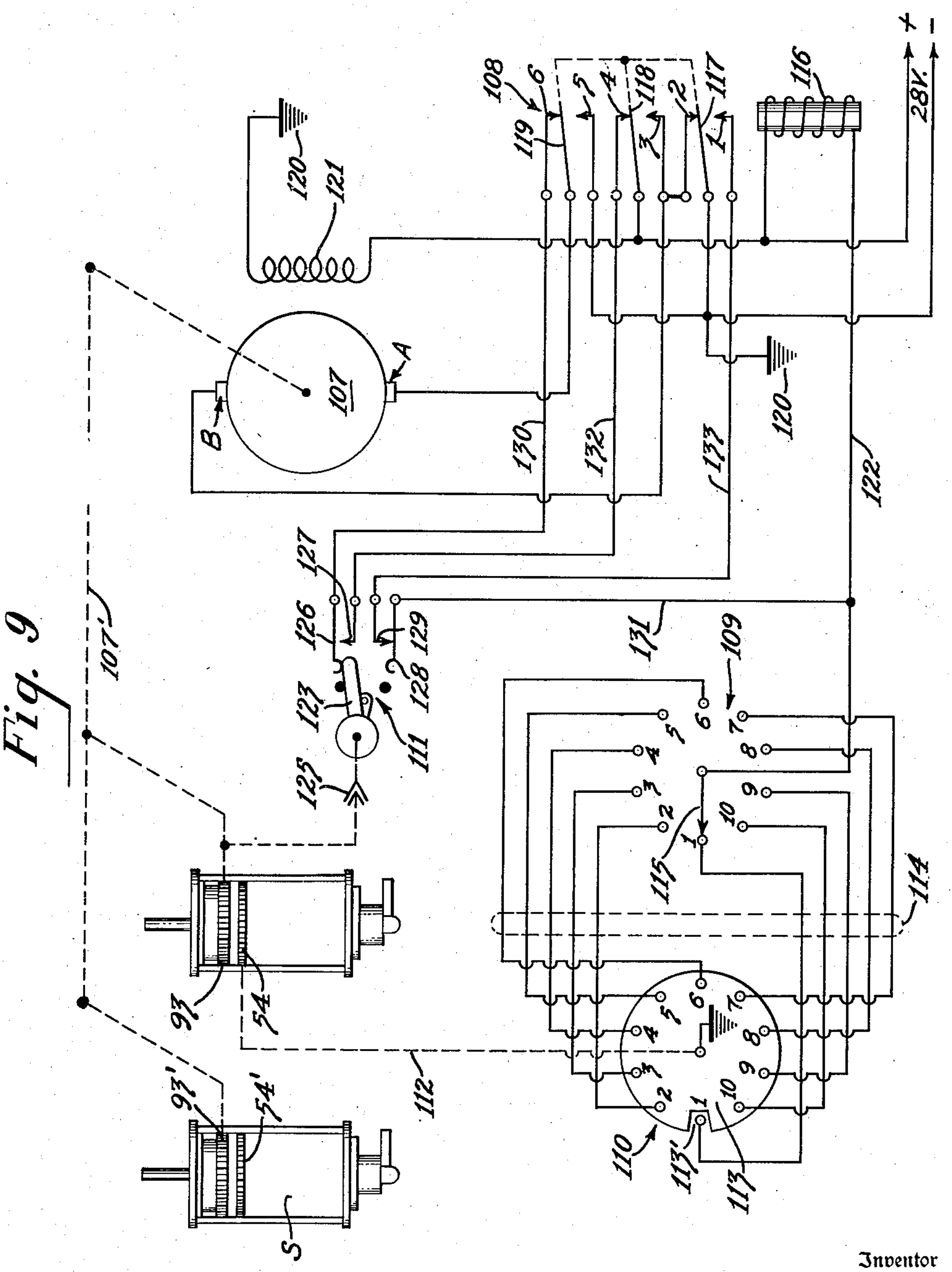
Fig. 9 is a schematic diagram of the electrical control system for operating the selector mechanism.

The electrical control system for operating the selector mechanism above described in proper sequence is shown schematically in Fig. 9 and comprises a reversible driving motor 107, a 3-pole double-throw relay 108, a remote control channel-selector switch 109, a homing switch 110, and a limit-and-holding switch 111. Through a suitable gear train including reduction gearing, represented in the drawing by the dash line 107', the reversible motor 107 is adapted to drive gear 93 of the selector unit in either direction. As described in connection with Figs. 5 and 6, gear 93 is adapted to drive drum gear 54 in only the clockwise direction by way of stud 77 and slip-cam 70, and through suitable gearing represented by the dash line 112, drum gear 54 is adapted to drive the rotor 113 of the homing switch 110. This switch is provided with ten equi-angularly spaced contact brushes marked 1 to 10 to correspond to the number of predetermined positions to which the selector unit is settable. The rotor is conductive except for an insulating or cut-out portion 113'. The gearing between drum gear 54 (or selector drum 52) and the homing-switch rotor 113 is such that they are phased to rotate in synchronism; that is, as cut-out 113' is successively moved from one brush contact to another, selector drum 52 is correspondingly rotated, and for each setting of the homing switch rotor there is a corresponding setting for the drum at which a drum slot 53 assumes a position directly underneath its corresponding stop-arm 60 to permit its locking part 63 to extend therethrough.

Channel-selector switch 109, which may be located at a remote point, though not necessarily, is also provided with ten brush contacts, numbered 1 to 10, corresponding ones of which are connected to the homing-switch contacts by means of a 10-conductor cable 114. A rotary arm 115 is manually settable and is adapted to make selective contact with the contacts of the selector switch.

Relay 108 consists of a winding 116 and three poles or armatures designated 117, 118, and 119 with which are associated front contacts 1, 3 and 5 and back contacts 2, 4 and 6. Pole 117 is connected to the — side of a voltage source (here designated 28 v.) and to ground 120 and is adapted to operate between front contact 1 and rear contact 2. Pole 118 is connected to the + side of the voltage source and is adapted to operate between front contact 3 and back contact 4. Pole 119 is connected to terminal A of motor 107 and is adapted to operate between front contact 5 and back contact 6. The other terminal B of the motor is connected jointly to pole contacts 2 and 3. The motor field 121 is connected between pole 118 (or the + side of the voltage source) and ground. The relay winding 116 also has one end connected to pole 118 (or the + side of the voltage source) and its other end is connected by way of a conductor 122 to rotary arm 115 of the manual selector switch.

The limit-and-holding switch 111 is provided with an arm 123 which is adapted to be actuated between two limiting positions from the selector drive gear 93 through a friction drive represented diagrammatically at 125, said friction drive enabling the switch arm to idle at each limit of its travel. Associated with the switch arm 123 are two pairs of normally-closed switch contacts 126—127 and 128—129, the former pair serving as the limit-switch and the latter pair as the holding-switch. The contacts 126 and 128 of these switches are movable and are connected, respectively, by conductors 130 and 131 to relay contact 6 and conductor 122. The switch contacts 127 and 128 are fixed and are connected, respectively, by conductors 132 and 133 to relay contacts 4 and 1.

Figure 10A:
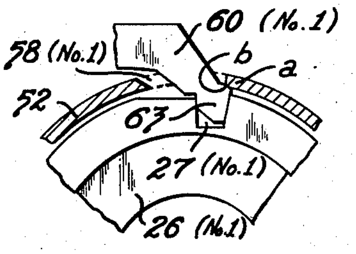
Figs. 10a to 10f are views showing, step-by-step, the cooperative relation between a stop-arm, a selector disc and the selector drum, which will be used in conjunction with the electrical system of Fig. 9 to explain a complete cycle of operation of the selector mechanism.

A complete cycle of operation of the selector mechanism will now be described. In Fig. 9 the electrical control system is shown at the termination of a previous cycle of operation which, as seen by the setting of the selector switch arm 115, is for an adjusted position of control shaft 12 (as well as of device 18') corresponding to channel No. 1, and in Fig. 10*a* are shown the operative position of the selector unit elements which were effective in bringing about said adjustment to the channel No. 1 shaft position. In this quiescent state of the mechanism, the locking part 63 of the No. 1 stop-arm 60 is wedged into notch 27 of the No. 1 selector disc 26 and is retained therein by reason of the forward edge *a* of the No. 1 drum slot 58 resting on the upwardly sloping edge *b* of locking part 63. Also, due to the de-energized state of the relay, the poles 117 to 119 are on their back contacts, as shown in Fig. 9, so that the holding circuit for the relay, namely, from 122, 131, 128, 129, 133 to ground 120, is broken at pole 117 and its front contact 1; the motor circuit for operating the motor in the counter-clockwise direction is broken at the limit switch contacts 126—127 (this being the direction of the motor operation when relay poles 118—119 are on their back contacts, the position shown in Fig. 9); and the motor circuit for operating the motor in the clockwise direction is broken at the front contacts 3 and 5 (this being the direction of motor operation when relay poles 118—119 are on their front contacts). The motor field winding 121, however, remains energized in either position of the relay poles, having a direct connection between the + side of the voltage source and ground 120.

Let it be assumed now that it is desired to adjust control shaft 12 and variable tuning condenser 18' to a setting corresponding to channel No. 9. The selector switch arm 115 would then be rotated manually to contact 9. This completes a circuit from the + side of the 28 v. source, through winding 116 of the relay, conductor 122, switch arm 115 on contact 9 of selector switch 109, through the cable conductor to contact 9 of homing switch 110, rotor 113 of said switch, to ground and back to the — side of said source. As a result, the relay is energized to actuate poles 117 to 119 to their respective front contacts 1, 3 and 5. With poles 118 and 119 now closed on their respective front contacts 3 and 5, the motor terminals A and B are connected respectively to the — and + sides of the voltage source, with the result that the motor is energized to rotate in the clockwise direction. With pole 117 now on its front contact 1 the holding circuit for relay winding 116 is now effective, said circuit preventing premature opening of the relay circuit at the cut-out 113' of the homing switch rotor 113. Upon energization of the motor, drive gear 93 of the selector unit also rotates in the clockwise direction, and the movable arm 123 of switch 111 is actuated from gear 93 to cause the limit-switch contacts 126—127 to close. This does not affect operation of the motor in the clockwise direction since the conductors 130 and 132 are open-circuited at back contacts 6 and 4, it being remembered that relay poles 119 and 118 are now on their front contacts 5 and 3. Upon the commencement of rotation of drive gear 93, the clutch retainer 91 rotates therewith but no motion will be transmitted to the control shaft by reason of the locked engagement between the No. 1 stop-arm 60 and the No. 1 selector disk 26 (Fig. 10*a*) which causes the clutch 86—95 to slip.

Figure 10B:
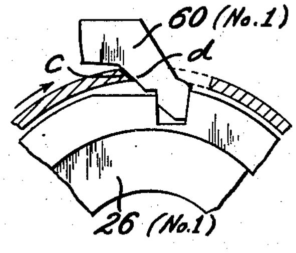
Figure 10C:
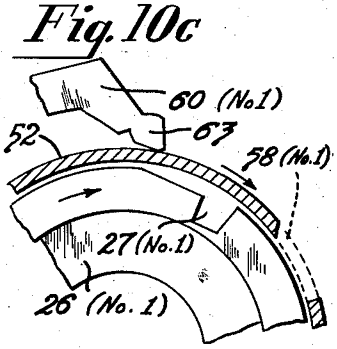

The drive gear continues to rotate, however, and depending upon the position of pin 103 in slot 104, motion will not be transmitted to the ring member 100 until the pin coacts with slot edge 106. When this lost-motion is taken up, the pin 103 will commence rotating ring 100, and the driving stud 77 carried thereby will also travel in the clockwise direction (Fig. 7). In Fig. 5 the direction of rotation of drive pin 77 is in the direction of arrow 78, towards edge 80 of the slip-cam 70. Until stud 77 reaches edge 80, drum 52 remains locked in the position in which it was set during the previous cycle, that is, in the No. 1 channel position as shown in Fig. 10*a*. With driving stud 77 now in contact with edge 80 (Fig. 5), rotation of the slip-cam and drum in the clockwise direction is begun. It will now be seen from Fig. 10*b* that as the drum is rotated in the clockwise direction the leading edge *a* of the slot 58 backs away from the inclined edge *b* of the stop-arm thus unlocking said arm. As the opposite edge *c* of the slot coacts with edge *d* of the stop-arm it applies a force thereto sufficient to rock or cam the arm upwardly about its pivot 3 and finally to thus disengage the locking part 63 from the disc notch 27 as shown in Fig. 10*c*. Due to action of the leaf spring 65, the stop-arm thus disengaged is caused to ride on the outer surface of the drum, Fig. 10*c*. Since the disc assembly and control shaft are now free to rotate, they will be rotated through the friction clutch in the same direction as the drum and drive gear.

Figure 10F:
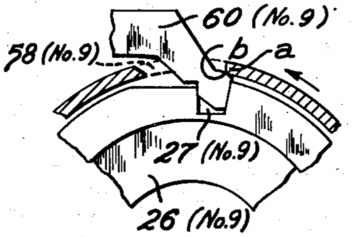
Figure 10E:
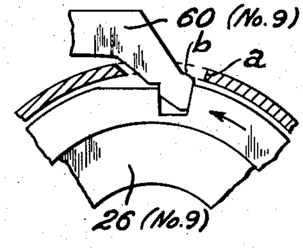
Figure 10D:
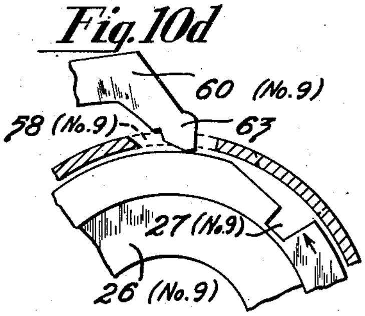

With the commencement of rotation of drum 52, rotor 113 of the homing switch is rotated in synchronism therewith, as previously explained, until cut-out portion 113' arrives opposite brush contact 9 whereat the relay circuit is momentarily broken, but by reason of the normally-closed contacts 128—129 of switch 111, the heretofore mentioned holding circuit for the relay is closed to thereby cause continued motor operation in the clockwise direction. After the drive gear has revolved about 350°, switch arm 123 will have been actuated to one limit of its travel whereat contacts 128—129 are opened, thereby breaking the holding circuit for the relay winding. The friction drive 125 then slips allowing the switch arm to idle at said position. The homing switch continues to revolve until it opens the relay circuit at 9—113', releasing the relay and causing the motor to operate in the reverse or counter-clockwise direction. At the termination of the motor operation in the clockwise direction, the drum will have been rotated to a position corresponding to that of the homing-switch rotor, so that the No. 9 drum slot 58 comes into registry with the part 63 of the No. 9 stop-arm. This is shown in Fig. 10*d*.

The second half of the cycle of operation commences with the motor operating in the reverse or counter-clockwise direction which occurs, as mentioned above, when relay 108 has been de-energized and poles 117 to 119 are returned to their back contacts 1, 3 and 5. With pole 118 on front contact 3 the B terminal of the motor is connected to the + side of the source, and with pole 119 on front contact 5 the A terminal of the motor is connected to the − side of the source. These potentials being the reverse of what they were for the clockwise rotation of the motor, the motor will now be actuated in the counter-clockwise direction.

As explained in connection with Fig. 6, in the reverse direction of motor operation, the driving stud 77 backs away from the edge 80 of the slip-cam and continues in the direction of arrow 79 toward edge 82 on the other side of cam projection 81. Simultaneously the clutch is operative to drive control shaft 12 and disc-assembly 20 in the same or counter-clockwise direction until part 63 of the No. 9 stop-arm is forced by action of its spring 65 to drop into notch 27 in the No. 9 selector disc 26 (Fig. 10e), stopping further rotation of the disc assembly, when the clutch will begin to slip as in the first half cycle. At this time edge *a* of the No. 9 drum slot 53 is spaced from the inclined edge *b* of the No. 9 stop arm a distance of approximately $\frac{1}{16}$ of an inch. Shortly after the selector disc is locked in position, as mentioned above, the driving stud 77 approaches the other side of cam projection 81, and then rides up incline 82 and onto top edge 83 to bring about the slight backward travel of the drum, described above in connection with Fig. 6, to thereby lock the stop-arm securely in position as shown in Fig. 10*f*. By this time switch arm 123 has been rotated in the counter-clockwise direction to its other limiting position whereat it opens limit switch contacts 126, 127 thereby breaking the motor circuit and stopping operation of the motor. This completes the cycle of operation.

In order that the desired synchronism between the drum and the homing switch may be maintained in spite of the slight backward travel of the drum which is utilized to effect locking of an operative stop-arm, there is provided, between the rotor 113 of the homing switch and its operating shaft, a lost-motion connection (not shown) which permits said shaft to rock through a corresponding angle in the reverse direction without disturbing the position of the rotor.

In some instances, it may be necessary to set-up the selector so that the disc notches 27 of certain of the discs are spaced apart angularly only to a slight degree. This would arise where the operating channels of the equipment are closely spaced. In order to meet this contingency, there is provided the previously described lost-motion connection (pin 103 and slot 104) between the clutch and the driving stud. This connection permits the selector disc-assembly to rotate in the reverse direction through a substantial part of a revolution, in addition to the excursion of stud 77 in rotating from engagement with the edge 80 of cam projection 81 into engagement with the edges 82 and 83, thereby assuring that the notch 27 of the selector disc made operative by the position at which drum 52 is stopped by the homing switch, will be brought into engagement with its corresponding stop-arm 60 before the limit switch is opened.

The lost-motion connection 103, 104 between drive gear 93 and ring 100 also performs a useful function in the movement of stud 77 over the edge 83 of cam projection 81 (Fig. 6) to the right as seen in Fig. 5. As stud 77 passes off the right-hand corner of the cam projection, spring 74 snaps slip-cam back to the position seen in Fig. 5. This produces a reaction between stud 77 and slip-cam 70, which in the present structure merely throws the ring 100 and stud 77 in some degree clockwise on bearing 102. This produces substantially zero reaction tending to move the drum 52. If stud 77 were fixedly connected to worm wheel 93, its movement off of the cam projection would create a relatively strong reaction in a direction tending to move drum 52 out of proper locking engagement with the part 63 of the stop-arm, thereby also tending improperly to close the limit switch.

A multiplicity of selector units similar to that herein described may be utilized in a single installation, with the several units driven from the same motor. In one case, in a two-way communication system, six such units were employed, four in the transmitter and two in the receiver, with the several drive gears 93, one in each unit, driven from the motor through suitable gearing and counter-shafts. In Fig. 9 there is shown a second selector unit S similar to the one described above, with its drive gear 93′ driven from the same motor 107. Since said drive gear 93′ is driven in synchronism with the drive gear 93 of the first selector unit, it is unnecessary to associate a separate homing switch with its drum gear 54′ or a separate limit switch with its drive gear 93′.

The procedure for initially setting up the several position-determining discs or rings 26 of the selector unit is as follows: The multi-position channel selector switch 109 is first set to any desired position, such as, for example, channel position No. 1. This initiates operation of the mechanism, and upon completion of the cycle as above described, the selector disc corresponding to channel No. 1 will have been rotated to a position whereat it will be locked by the corresponding No. 1 stop-arm. With the disc so locked, lever 44 at the front of the manual control knob is pulled out to thereby unclamp the disc stacks. The control knob is then manually rotated, the No. 1 disc still being locked, until the variable element is turned to its desired angular setting. The discs are then clamped together again by pushing in lever 44 to its first position. Thereafter, for the No. 1 position of the control switch, the selector disc-assembly will be actuated automatically to the position just set. The same procedure is followed for all of the other positions of the control switch.

By reason of the fact that the selector discs are mounted on the ring bushings 25 with sufficient friction and are unclamped at their peripheral rim portions which are separated by spacers or washers locked against rotation, the manual rotation, in the setting-up operation, of all of the discs of the stack, except the one that is held in locked position, will not cause accidental displacement of any of the other discs which may have been previously adjusted.

As a further precaution for preventing accidental rotation of the selector discs (other than the one in the process of being adjusted), means are provided to hold pressure plate 28 in its disc clamping position under spring action. This means comprises a coil spring 140 (Fig. 2) which encircles the rod 38 within sleeve 35 and extends between the shoulder 141 within the sleeve at the left and the nut 36 at the right. Consequently, in the released position of lever 44, due to the expansion of spring 140, cap 37 is forced against the cam surface of lever 44, and the left edge of sleeve 35 is forced against pressure plate rod 32. The force so applied to the pressure plate is not as great as that applied in the locked position of lever 44 but it is sufficient to prevent undesired disc rotation.

In the released position of lever 44, when the selector discs are being individually adjustable, it is most desirable to have friction clutch 86—95 ineffective to thereby remove the drag on the disc-assembly during the manual rotation thereof. The construction for accomplishing this involves a plunger 142 (Fig. 2) fitted within a central bore 143 formed in the control shaft 12. This bore communicates with the clutch pin slot 88 at the left and with a second bore 144 of enlarged diameter at the right. The plunger at the right terminates in a head 145 which is slidably retained within bore 144, and a coil spring 146 which tends to urge the plunger to the right is interposed between the head and a shoulder 147. A coil spring 148 is retained within bore 144 between plunger head 145 and a washer 149, and the end of the rod 38 which extends through the pressure plate rod abuts against the right face of the washer 149. It will be seen from this construction that, during the setting-up process and when the lever is released, nut 36 and cap 37 will move to the right somewhat under action of spring 140, and with it will move rod 38, allowing removal of pressure of the plunger 142 on the clutch disc pin 87. This movement of rod 38 is aided to some extent by expansion of the coil 148 which acts also to keep plunger 142 against the clutch pin 87 but at a pressure less than that in the locked position of lever 44. The pressure is still further reduced by action of the spring 146 which tends to move the plunger to the right. Therefore, in the released position of lever 44, with the pressure on the clutch pin reduced to permit slippage between the clutch plates, it is possible by means of the manual control knob 16 to rotate the control shaft and the disc-assembly freely in either direction without causing movement of the drive gear 93 (including the gear train in mesh therewith) and clutch retainer 94 carried thereby, which would otherwise act as excess load if this precaution were not taken.

In order to adjust or regulate the clutch torque, after initial assembly of the mechanism or, when it is found necessary, after extended use due to wear of the clutch parts, the screw-threaded plug 14' at the rear of the unit is rotated a sufficient amount in one direction or the other to impart the necessary axial movement to the clutch retainer 94 through the medium of ball-bearing 14. As the result of this axial movement of the retainer more or less pressure is caused to be applied between clutch plates 86 and 95 as well as between clutch plate 95 and the inner surface of the retainer. A set-screw 14'' on the outer face of the plug serves to lock the plug in its adjusted position.

Axial adjustment of the rod 38, by rotation of nut 36 and cap 37 threaded on the front end of the rod, is used to secure a proper balance between pressure on the clutch along rod 142 and pressure on the selector discs through pressure plate 28. Such adjustment is necessary because of variations due to manufacturing tolerances.

While I have shown and described a preferred embodiment of my invention, it will be understood that various modifications and changes will occur to those skilled in the art without departing from the spirit and scope of this invention. I therefore contemplate by the appended claims to include any such modifications as fall within the true spirit and scope of my invention.

What I claim is:

1. A motor-operated selector mechanism adapted to effect the automatic adjustment of a rotatable device to one of a plurality of predetermined angular positions, comprising a stack of position-determining rings, each corresponding to one of said positions, mechanically coupled as a unit to the device to be adjusted, said rings being axially spaced on a shaft and individually angularly adjustable thereon, a drum encircling said rings provided with a plurality of slots which are aligned each with one of said rings and which are also equi-angularly spaced, said drum being selectively actuatable to settings which correspond each to one of said predetermined positions, a plurality of stop-arms, one for each ring, disposed externally of the drum and each having a locking part which normally rests on the drum, said drum, depending upon the angular setting to which it is actuated, permitting a stop-arm locking part to drop through the drum slot aligned therewith and to coact with the aligned ring, said stop-arm eventually locking said ring to thereby stop said ring-stack and the device to be adjusted at the predetermined position corresponding to said drum setting, and drive means for actuating said drum and ring stack in a predetermined sequence of operations.

2. A motor-operated selector mechanism adapted to effect the automatic adjustment of a rotatable device to one of a plurality of predetermined angular positions, comprising a stack of position-determining rings, mechanically coupled as a unit to the device to be adjusted, said rings being axially spaced on a shaft and individually angularly adjustable thereon, a drum encircling said rings provided with a plurality of equi-angularly spaced slots, a plurality of stop-arms disposed externally of the drum and each having a locking part which normally rests on the drum, said rings, drum slots and stop-arms being arranged so that corresponding ones of each are disposed in coplanar relation, each such set of coplanar elements corresponding to one of said predetermined angular positions of adjustment, said drum being selectively actuatable to setting which correspond each to one of said predetermined positions, said drum, depending upon the angular setting to which it is actuated, permitting the locking part of only one of the stop-arms to drop through its aligned drum slot and to coact with its aligned ring, said stop arm eventually locking said ring to thereby stop said ring-stack and the device to be adjusted at the predetermined position corresponding to said drum setting, and drive means for actuating said drum and ring-stack in a predetermined sequence of operations.

3. A selector mechanism in accordance with the invention defined in claim 2 wherein the several rings of the stack are disposed between a lock-nut fastened to the shaft and an axially movable pressure plate, and means operable to apply pressure to said plate in opposition to a spring whereby the several rings are clamped together to rotate with the shaft, said spring upon release of the pressure means tending to hold said rings together with sufficient force to permit of individual angular adjustment of the rings without disturbing the adjustments of the other rings of the stack.

4. A selector mechanism in accordance with the invention defined in claim 2 wherein the several rings of the stack are disposed between a lock-nut fastened to a shaft and an axially movable pressure plate, means coacting with the pressure plate adapted upon movement in one direction to force said plate to an operative position whereby the several rings are clamped together and upon movement in the opposite direction to permit said plate to move to an inoperative position whereat the several rings are unclamped, said plate-coacting means comprising a sleeve member which abuts the pressure plate at one end and is provided with a cap at the other end and a coil spring between said sleeve and cap, the action of the spring being such that in the inoperative position of the coacting means the sleeve member is forced against the pressure plate with sufficient force to permit of individual angular adjustment of the rings without disturbing the adjustments of the other rings of the stack.

5. A selector mechanism as defined in claim 2 including a friction clutch between the drive means and the ring stack, means for clamping together the several selector rings of the stack to operate as a unit and for unclamping said rings to permit individual angular adjustment thereof, and means under the control of said ring clamping means operative to make the clutch effective when the rings are in the clamped condition and ineffective when the rings are in the unclamped condition.

6. A selector mechanism adapted to effect the automatic adjustment of a device to one of a plurality of predetermined positions, comprising a selector disc assembly mechanically coupled to the device to be adjusted and having notches arranged therein, angular positioning means having apertures therein and being selectively actuatable to said apertures which constitute settings which correspond each to one of said predetermined positions, lever means arranged in cooperative relationship with the notches of said disc assembly and the apertures of said angular positioning means, said lever means being operable upon actuation of said angular positioning means to a selected one of its settings to stop the disc assembly at a position corresponding to said setting, clutch means for actuating said device and said selector disc assembly in a predetermined sequence of operations, clutch adjusting means for varying the clutch pressure to provide sufficient friction to drive the selector and said device, and drive means for driving the clutch means.

7. A selector mechanism adapted to effect the automatic adjustment of a device to one of a plurality of predetermined positions, comprising a selector disc assembly mechanically coupled to the device to be adjusted, said assembly having a plurality of discs each having a notch therein, a member encircling the disc assembly having apertures corresponding in number to the notches of said disc assembly and being selectively actuatable to settings which correspond each to one of said predetermined positions, lever means positioned in line with the notches of said disc assembly and the apertures of said encircling member means urging said lever means into engagement with said assembly and said member upon actuation of said member to a selected one of its settings to stop the disc assembly at a position corresponding to said setting, adjustable clutch means for actuating said device and said selector disc assembly in a predetermined sequence of operations, and drive means for driving the adjustable clutch means.

8. A selector mechanism adapted to effect the automatic adjustment of a device to one of a plurality of predetermined positions, comprising a selector disc assembly mechanically coupled to the device to be adjusted and having notches in each of the discs constituting said assembly, a member encircling the disc assembly and having apertures therein and being selectively actuatable to settings which correspond each to one of said predetermined positions and to one of said apertures, means individual to each of said settings resiliently urged into potential engagement with the notches of said disc assembly and the apertures of said encircling member operable, upon actuation of said member to a selected one of its settings, to stop the disc assembly at a position corresponding to said setting, and clutch means for actuating said device and said selector disc assembly in a predetermined sequence of operations, clutch adjusting means for varying the clutch pressure to provide sufficient friction to drive the selector and said device, and drive means for driving the clutch means.

9. A motor-operated selector mechanism adapted to effect the automatic adjustment of a device to one of a plurality of predetermined positions, comprising a selector disc assembly mechanically coupled to the device to be adjusted and having notches therein, angular positioning means having apertures therein and being selectively actuatable to settings corresponding to said apertures and which also correspond each to one of said predetermined positions, a plurality of resiliently biased pawl members arranged for potential insertion into the notches of said disc assembly and the apertures of said angular positioning means, only one of said pawl members being operable upon actuation of said angular positioning means to a selected one of its settings to stop the disc assembly at a position corresponding to said setting, clutch means for actuating the selector and said device, drive means for driving said clutch means, manually operable means also for adjusting said device, and clutch releasing means to make operable the ease of manipulation of the manually operable means.

WILLIAM D. LA RUE.

REFERENCES CITED

The following references are of record in the file of this patent:

UNITED STATES PATENTS

| Number | Name | Date |
|---|---|---|
| 2,174,552 | Collins | Oct. 3, 1939 |
| 2,391,470 | May | Dec. 25, 1945 |
| 2,512,664 | May | June 27, 1950 |